United States Patent
Kihira et al.

(10) Patent No.: US 6,404,387 B1
(45) Date of Patent: Jun. 11, 2002

(54) ADAPTIVE ARRAY ANTENNA DEVICE AND BASE STATION ADAPTIVE ARRAY ANTENNA DEVICE

(75) Inventors: Kazunari Kihira; Isamu Chiba, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/868,846

(22) PCT Filed: Oct. 20, 2000

(86) PCT No.: PCT/JP00/07332

§ 371 (c)(1),
(2), (4) Date: Jul. 18, 2001

(87) PCT Pub. No.: WO01/29988

PCT Pub. Date: Apr. 26, 2001

(30) Foreign Application Priority Data

Oct. 22, 1999 (JP) .............................. 11-300757

(51) Int. Cl.[7] ................................. G01S 3/16
(52) U.S. Cl. ....................... 342/378; 342/383
(58) Field of Search ................. 342/368, 378, 342/383, 380, 382

(56) References Cited

U.S. PATENT DOCUMENTS 5,796,779 A * 8/1998 Nussbaum et al. ......... 375/267
6,208,683 B1 * 3/2001 Mizuguchi et al. ......... 375/140

FOREIGN PATENT DOCUMENTS

| JP | A1129508 | 5/1989 |
| JP | A6181410 | 6/1994 |
| JP | A7297733 | 11/1995 |
| JP | A7321681 | 12/1995 |
| JP | A9162799 | 6/1997 |
| JP | A10270928 | 10/1998 |
| JP | A10303808 | 11/1998 |
| JP | A11274976 | 10/1999 |

* cited by examiner

Primary Examiner—Dao Phan (57) ABSTRACT

Since adaptive control has been made by using different reference characters every transmitter-receiver, it has been necessary to provide an adaptive control device every transmitter-receiver.

Hereupon, an adaptive array antenna apparatus according to the invention provides a weighting control device for calculating a weight coefficient to control weighting processing so that electric power of array signals synthesized by applying weighting processing to signals received by antennas of a plurality of systems becomes minimum, and an adaptive control device for using the weight coefficient for application of weighting processing to thereby form null points of antenna directivity in a direction, along which interference signals having a greater electric power than that of desired signals arrive, to remove the interference signals and to output array signals to transmitter-receivers.

6 Claims, 10 Drawing Sheets

(RECEPTION: OUTPUT POWER MINIMIZATION
TRANSMISSION: MAXIMAL RATIO COMBINING)

ADAPTIVE ARRAY ANTENNA DEVICE AND BASE STATION ADAPTIVE ARRAY ANTENNA DEVICE

This application is the national phase under 35 U.S.C. §371 of PCT International Application No. PCT/JP00/07332 which has an International filing date of Oct. 20, 2000, which designated the United States of America and was not published in English.

FIELD OF THE INVENTION

The invention relates to an antenna apparatus for ensuring the quality of communication in mobile communication, and more particularly, to an antenna apparatus in communication systems, in which the CDMA system is used to comprise a direct spread system.

BACKGROUND OF THE INVENTION

Figure 10:
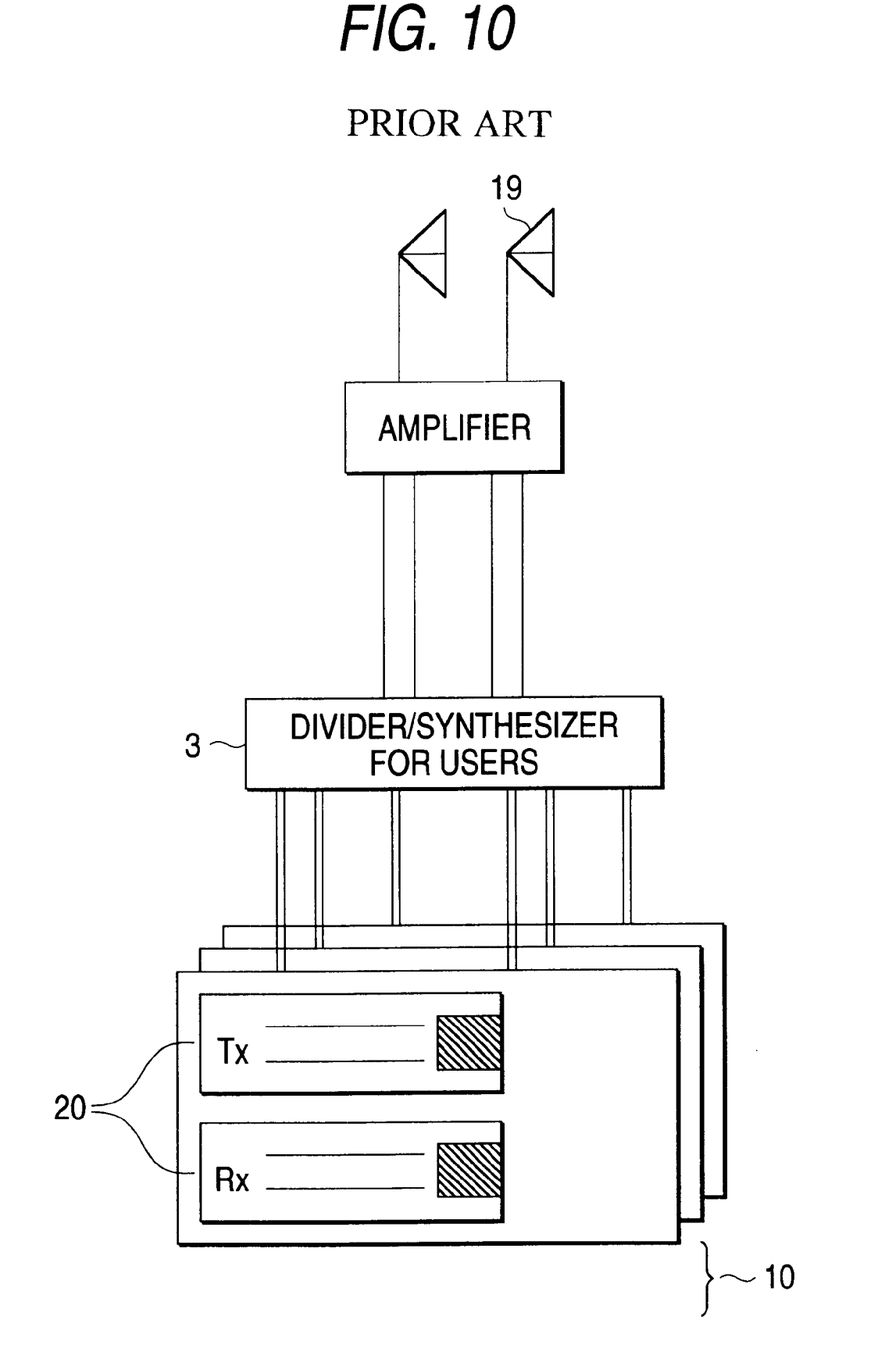
FIG. 10 is a block diagram showing the constitution of a prior antenna apparatus.

In order to remove multiple reflected waves and interference from other users in mobile communication, there is provided an adaptive array antenna, which uses a plurality of antennas to adaptively control weighting thereof to direct null in a direction of interference signals. For example, FIG. 10 shows an embodiment of an antenna apparatus having an adaptive function disclosed in Japanese Patent Laid-Open No. 162799/1997. The reference numeral 10 denotes transmitter-receivers, 19 an antenna, and 20 adaptive control units.

As shown in FIG. 10, signals received by two elements are distributed and made inputs to the respective transmitter-receivers 10. And the adaptive control unit 20 is arranged for each of the transmitter-receivers 10 (each user) to perform removal of interference. The reason for such arrangement is that algorithm used in mobile communication is usually based on the minimum mean square error method, in which reference signals resembling (highly correlative) desired signals are used. The evaluation function Q of the minimum mean square error method is represented by the following formula.

$$Q=E[|r(x)-y(t)|^2] \quad (1)$$

$E[\cdot]$: expectation value $r(t), y(t)$: reference signals and array outputs

As described above, conventional constitutions cause a problem that an adaptive control unit is necessary for each of transmitter-receivers to increase the number of channels as well as scale of an associated apparatus. In CDMA systems, since it is necessary to perform adaptive processing after despreading, the problem with respect to scale of an associated apparatus is made significant with an increase in the number of channels. Also, in the case where the adaptive function is to be added to existing apparatuses, there is the need of designing the entire transmitter-receivers in consideration of adaptive control and replacing all elements by new ones. Therefore, other devices are much influenced thereby, and there are caused problems in terms of various aspects such power consumption, installation cost, installation quality and the like.

The invention has been contemplated to solve the above-mentioned problems, and has its object to realize an antenna apparatus in mobile communication, which is simple in construction to remove interference signals responsible for deterioration of the quality of communication on other users.

DISCLOSURE OF THE INVENTION

An adaptive array antenna apparatus according to the invention comprises a main antenna, an auxiliary antenna smaller than the main antenna, an adaptive control device having weighting means for applying weighting to signals output from the main antenna and the auxiliary antenna with the use of a predetermined weight coefficient, and synthesizing means for synthesizing signals, which are output from the main antenna and the auxiliary antenna and to which weighting is applied by the weighting means, and a weighting control device for calculating a weight coefficient so that electric power of signals output from the synthesizing means becomes minimum, and for outputting the calculated weight coefficient to the weighting means to control weighting, the adaptive control device acting to output signals output from the synthesizing means, to transmitter-receivers.

An adaptive array antenna apparatus according to the invention comprises a distribution synthesizer connected to a main antenna provided in a base station for distributing and outputting signals received by the main antenna, an auxiliary antenna, of which size is determined depending upon levels of interference signals of an environment where the base station is installed, and an adaptive control device having weighting means for using a predetermined weight coefficient to apply weighting to signals output from the main antenna and the auxiliary antenna, synthesizing means for synthesizing signals, which are output from the main antenna and tile auxiliary antenna and to which weighting is applied by the weighting means, and a weighting control device for calculating a weight coefficient so that electric power of signals output from the synthesizing means becomes minimum and for outputting the calculated weight coefficient to the weighting means to control weighting, the adaptive control device acting to output signals output from the synthesizing means, to transmitter-receivers.

BEST MODE FOR CARRYING OUT THE INVENTION

Embodiment 1

Figure 1:
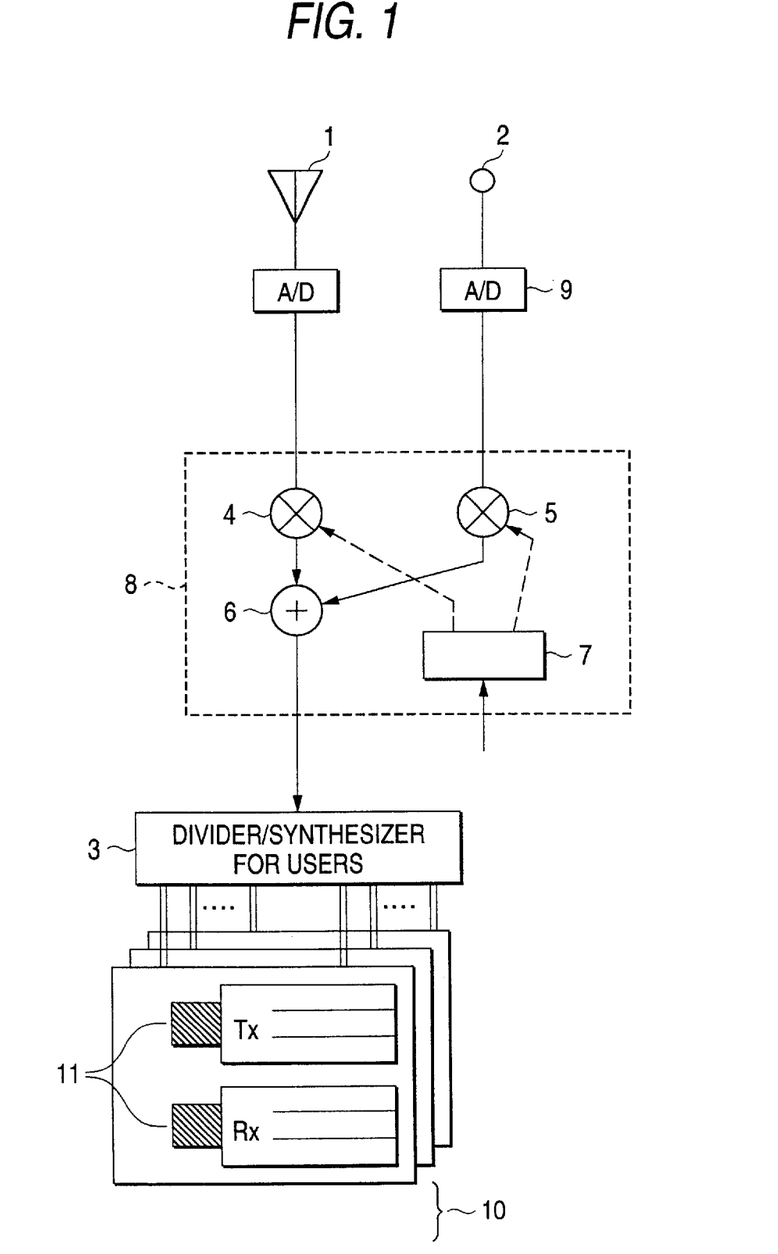
FIG. 1 is a block diagram showing the constitution of an adaptive array antenna apparatus according to an embodiment 1 of the invention.

FIG. 1 is a block diagram showing the constitution of an adaptive array antenna apparatus according to an embodiment 1 of the invention. The reference numeral 1 denotes a main antenna, 2 an auxiliary antenna, 3 a divider/synthesizer for users, 4 a multiplier, into which signals are input from the main antenna 1, 5 a multiplier, into which signals are input from the auxiliary antenna 2, 6 an adder, 7 a weighting control device, 8 an adaptive control device, 9 an A/D converter, 10 transmitter-receivers, and 11 matched filters.

CDMA (Code Division Multiple Access) means code division multiple access, and is a technique for performing multiple access with the use of the spread spectrum communication, by which spectrum of information signals are spread and transmitted in an adequately wide band as compared with the band width of the spectrum. That is, since large wide band signals are used in transmission, it is possible in CDMA to provide high-speed multimedia services, and so to realize high-speed data transmission such as animations. However, as the higher in speed transmission is, the more wide bands are used, so that electric power for transmission of signals becomes large. Accordingly, a user for performing such high-speed transmission makes an interference signal for exceedingly deteriorating the quality of transmission with a user, who performs a usual voice transmission.

An explanation will be given below to operations of the adaptive array antenna apparatus shown in FIG. 1. First, signals received by the main antenna 1 and the auxiliary antenna 2 are converted into baseband signals by the A/D converter 9, which signals are input into the adaptive control device 8. The adaptive control device 8 performs adaptive control making use of the power minimization method to output array signals. Concretely, the weighting control device 7 is used to calculate amplitude phase of signals received by the auxiliary antenna 2 so as to minimize an expectation value of output power of array composition, that is, to calculate a weight coefficient, which is used to provide for weighting of the received signals in the multiplier 5. And the weighted, received signals of the auxiliary antenna 2 are input into the adder 6 to be synthesized with signals output from the multiplier 4, thus outputting array signals. The divider/synthesizer for users 3, into which the array signals are input, selectively distributes signals to the transmitter-receivers 10. The respective transmitter-receivers 10 can take out information signals from desired signals by performing despreading processing of the received signals in the matched filters 11.

The invention makes use of the fact that spread signals spread in the CDMA system being a transmitting side are of a property to be transmitted in a state, in which SNR (signal-to-noise power ratio) is very low. Usually, low-speed transmission users involving voice or the like perform transmission with transmission power of thermal noise level or lower. Also, the transmission power increases in proportion to bit rate. Since a high-speed transmission users performing transmission of images, animations or the like use many wide bands (channels), transmission power increases. That is, interference signals having the thermal noise level or higher will be received. Under these circumstances in none but CDMA, with signals prior to despreading processing on a receiver side, desired signals intended for voice transmission are in the state of being embedded in noise. Accordingly, when a simple power minimization method is used to remove interference signals, only interference signals of large power having the thermal noise level or higher will be removed.

The minimum mean square error method being an adaptive control algorithm having been employed in conventional adaptive array antenna apparatuses comprises performing an adaptive control with properties of desired signals as preliminary knowledge. In contrast, the power minimization method employed in the invention can perform completely blind processing without the need of such preliminary knowledge. Algorithm used in such power minimization method includes Power Inversion (PI) Algorithm. An explanation will be given below to PI Algorithm. A weight coefficient W is given by the following formula.

$$W = R_{xx}^{-1} S \quad (2)$$

$R_{xx}$: correlation matrix of input signals

S: $[1 \ 0 \ \ldots \ 0]^T$ constrained vector

The formula (2) will be as follows when written in the form of a two element two wave model.

$$W = \begin{bmatrix} |x_{d1}|^2 + |x_{i1}|^2 + \sigma^2 & x_{d1}x_{d2}^* + x_{i1}x_{i2}^* \\ x_{d1}^*x_{d2} + x_{i1}^*x_{i2} & |x_{d2}|^2 + |x_{i2}|^2 + \sigma^2 \end{bmatrix}^{-1} \begin{bmatrix} 1 \\ 0 \end{bmatrix} \quad (3)$$

$$= \frac{1}{D} \begin{bmatrix} |x_{d2}|^2 + |x_{i2}|^2 + \sigma^2 \\ -x_{d1}^*x_{d2} - x_{i1}^*x_{i2} \end{bmatrix}$$

$X_{d1}$, $X_{d2}$: desired signal components received by the main antenna and the auxiliary antenna $X_{i1}$, $X_{i2}$: interference signal components received by the main antenna and the auxiliary antenna $\sigma^2$: thermal noise power $$D = \det(R_{xx}) \quad (4)$$

When desired signals and interference signals are non-correlated in this manner, the weight coefficient can be written using respective components of desired signals, interference signals and thermal noise. At this time, characteristics will be determined depending upon the relationship between the respective signal powers and the thermal noise power, so that large signals as compared with thermal noise become targets being suppressed. It is thinkable that the relationship between the signal powers and the thermal noise power is reversed in mobile communication because the receiving state varies every moment. Hereupon, the performance of an adaptive array antenna is more or less abated by adding virtual, pseudo-noise components to $\sigma^2$ in the formula (3) to enable making it hard to suppress desired signals. Also, by doing so, appropriate pseudo-noise is added to thereby enable selecting signals being targets suppressed.

Also, the interference removing effect possessed by the above-mentioned adaptive array antenna apparatus depends upon the size of the auxiliary antenna. And the size of the auxiliary antenna is determined depending upon levels of those interference signals, which should be removed. Since the degree of interference suppression required for meeting with the demanded quality differs depending upon environments of respective base stations, the size of the auxiliary antenna is determined depending upon the suppression level of interference signals, which is needed in that environment where the auxiliary antenna is installed. An explanation will be given below to a way to determine the size of the auxiliary antenna. First, a required gain of the auxiliary antenna relative to the main antenna is found.

$$\text{Gain} = \sqrt{\frac{-b \pm \sqrt{b^2 - 4ac}}{2a}} \quad (5)$$

Figure 2:
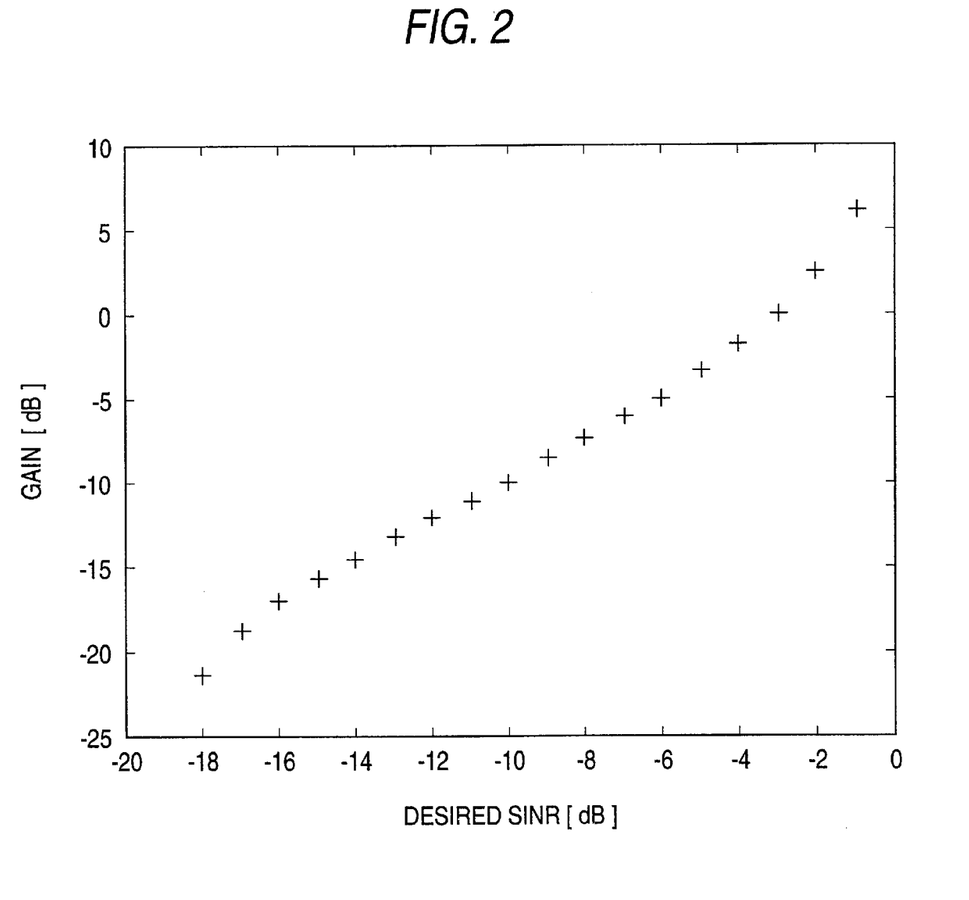
FIG. 2 is a graph showing the relationship between SINR of desired signals and the required gain of an auxiliary antenna.

$a = 2x_d^2 x_i^4 (1-\rho) - \text{SINR} \cdot \{2x_d^4 x_i^2 - 2\rho x_d^4 + \sigma^2 (x_d^2 + x_i^2)^2\}$ $b = 2x_d^2 x_i^2 \sigma^2 (1-\rho) - \text{SINR} \cdot \sigma^2 \{(x_d^2 + x_i^2)^2 + 2\sigma^2 (x_d^2 + x_i^2)\}$ $c = x_d^2 \sigma^4 - \text{SINR} \cdot (x_i^2 \sigma^4 + \sigma^6)$ $b^2 - 4ac \leq 0 \quad (6)$ Alternatively, if power of interference signal is very great as compared with power of desired signals and desired signals are negligible, $a = 2x_d^2 x_i^4 (1-\rho) - \text{SINR} \cdot \{\sigma^2 x_i^4\}$ $b = 2x_d^2 x_i^2 \sigma^2 (1-\rho) - \text{SINR} \cdot \sigma^2 \{x_i^4 + 2\sigma^2 x_i^2\}$ $c = x_d^2 \sigma^4 - \text{SINR} \cdot (x_i^2 \sigma^4 + \sigma^6) \quad (7)$ $x_d$: amplitude of a desired signal received by the main antenna $x_i$: amplitude of an interference signal received by the main antenna $\sigma^2$: thermal noise power SINR: a desired SINR value $\rho = \cos(kd(\sin\theta_d - \sin\theta_i))$ k: wave number d: element spacing $\theta_d$, $\theta_i$: directions, along which a desired signal and an interference signal arrive That is, the required gain of the auxiliary antenna can be obtained by setting a desired SINR and giving SIR, SNR and directions, along which respective signals arrive, at the time of reception, and element spacing, and frequencies. It becomes possible to roughly calculate the size of the auxiliary antenna on the basis of the required gain found in the above manner. By way of example, the required gain in the case of SIR=−10 dB and SNR=0 dB is shown in FIG. 2. An axis of abscissas represents a desired SINR and an axis of ordinates represents the required gain of the auxiliary antenna. It is found from the figure that when SIR=−10 dB is achieved, the required gain of the auxiliary antenna is about −10 dB and suffices to be a magnitude of about one tenth relative to that of the main antenna.

Figure 3:
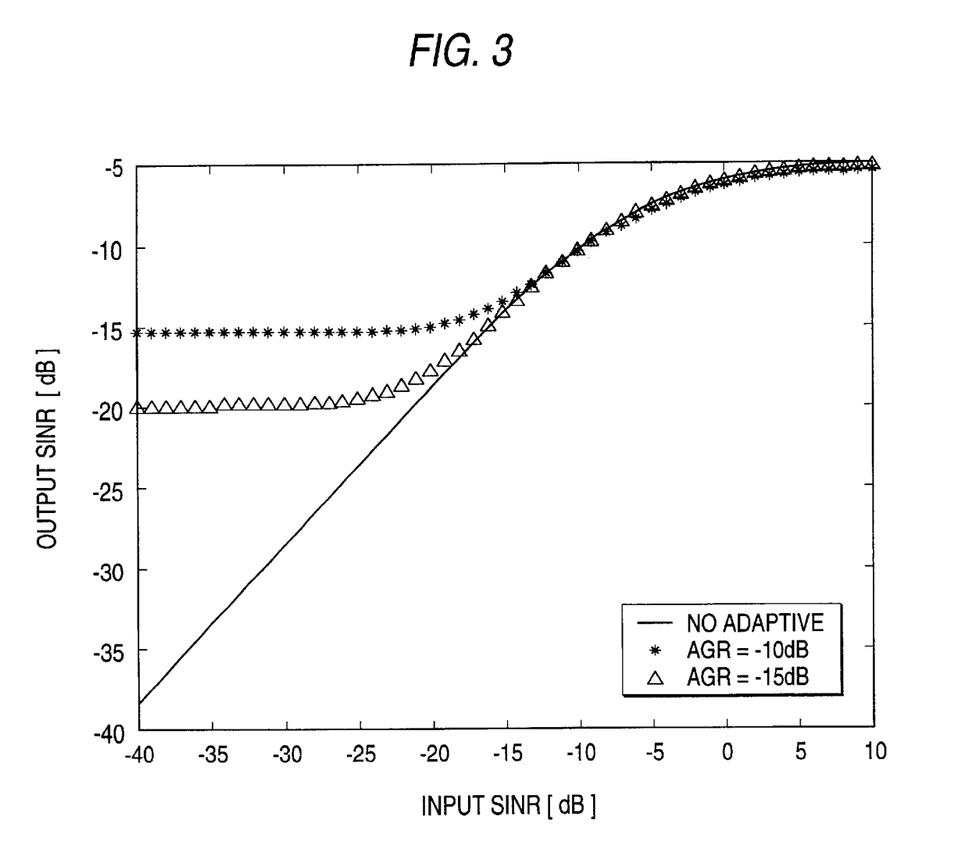
FIG. 3 is a graph showing the SINR output characteristics of the adaptive array antenna apparatus according to the invention.

An explanation will be given to effects of the adaptive array antenna apparatus described above. FIG. 3 shows results of characteristics of the signal to interference plus noise power ratio after the adaptive control in an environment, in which two waves of a desired signal and an interference signal arrive with two-element constitution composed of a main antenna and an auxiliary antenna. An axis of abscissas represents SIR (desired signal power versus interference signal power) and an axis of ordinates shows that as SINR increases, an interference signal is removed and a favorable characteristics can be obtained. A state with the input SNR ((signal-to-noise power ratio) being −5 dB and prior to despreading in CDMA is simulated. AGR in FIG. 3 represents the gain ratio of the auxiliary antenna and the main antenna, and shows that as the ratio decreases, gain of the auxiliary antenna is low.

That is, it is shown that the antenna is decreased in size. The adaptive control according to the invention is performed to achieve a great improvement in characteristics relative to reception only by the main antenna shown by solid line in FIG. 3. Therefore, the use of an auxiliary antenna having a small gain, that is, a small size enables realizing the function of interference removal while contemplating miniaturization of an antenna apparatus. Also, it is found that even in the case where SIR is large, that is, large interference signals are absent, desired signals are almost never removed.

As described above, the adaptive array antenna apparatus according to the invention performs adaptive control prior to distribution to respective transmitter-receivers (respective users), whereby there is no need of preparing adaptive control devices in the respective transmitter-receivers, which has no great influences on power consumption, calculation amount and device scale. And since adaptive control is performed with the use of not the minimum mean square error method but the power minimization method, high-powered interference signals can be removed by a simple arrangement without the need of synchronization with any reference signal. The use of an auxiliary antenna having a small size enables compatibility of miniaturization of an apparatus size and the interference removing function. Also, since there is no need of synchronization with any reference signal, completely blind processing is enabled. The above can be realized by a very simple arrangement because of no need of high-speed sampling.

In addition, the above-mentioned adaptive array antenna apparatus can meet demanded qualities by virtue of increasing the number of auxiliary antennas depending upon the number of interferences, removal of which is desired. In this case, the number of auxiliary antennas is equal to the number of interference signals.

Embodiment 2

Figure 4:
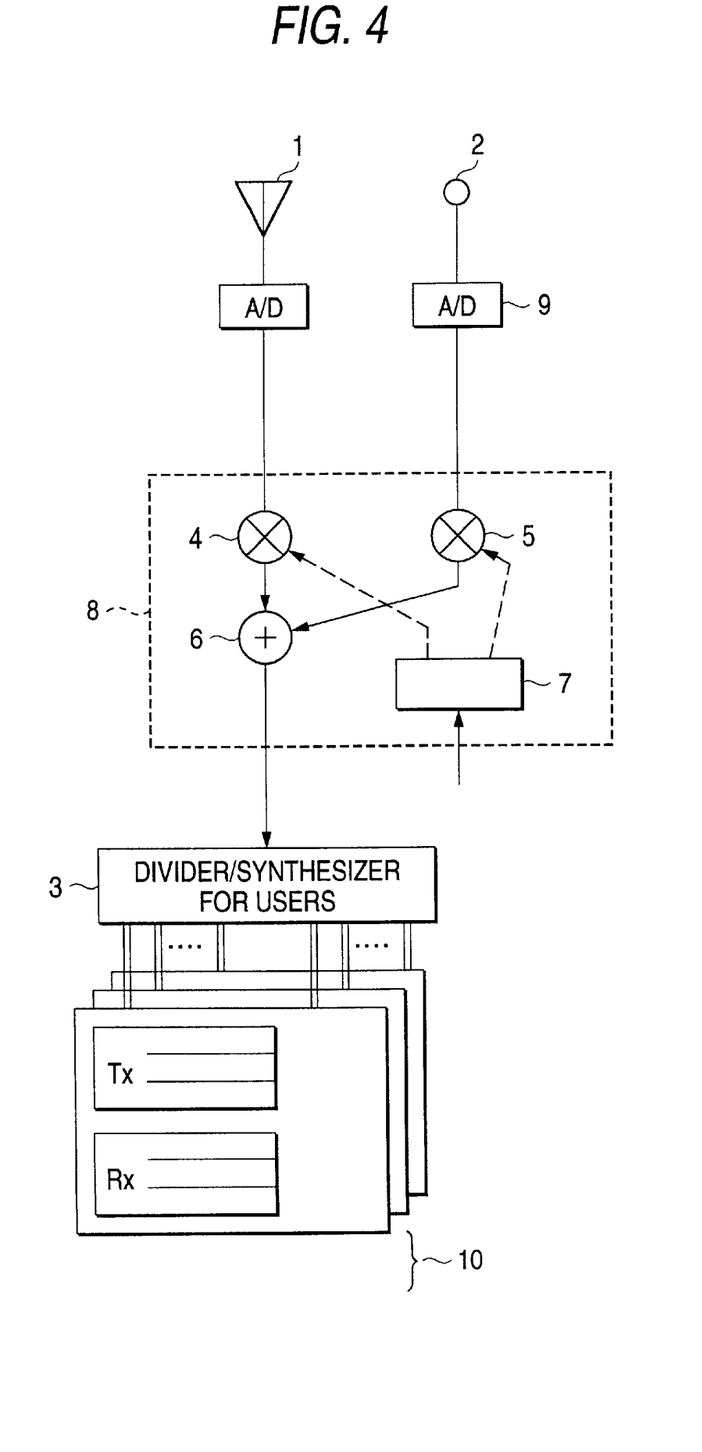
FIG. 4 is a block diagram showing the constitution of an adaptive array antenna apparatus according to an embodiment 2 of the invention.

FIG. 4 is a block diagram showing the constitution of an adaptive array antenna apparatus according to an embodiment 2. In FIG. 4, the same reference numerals as those in FIG. 1 denote the same or corresponding parts to those therein, and so an explanation thereof will be omitted. The adaptive array antenna apparatus shown in the embodiment 1 has been suited to reception of signals and removal of interference in the CDMA system. The adaptive array antenna apparatus described below is applicable to signals of all modulation systems, provided that interference signals are greater than desired signals in terms of power, irrespective of whether signals received are ones of the CDMA system or other systems.

Adaptive control based on the power minimization method is carried out by using the A/D converter 9 to convert signals received by the main antenna 1 and the auxiliary antenna 2 into baseband signals and using the adaptive control device 8 with outputs therefrom. Concretely, the weighting control device 7 is used to calculate amplitude phase of signals received by the auxiliary antenna 2 so as to minimize an expectation value of output power of array composition, and the signals are further adjusted with respect to a weight coefficient thereof to be united with an output of the main antenna 1 by means of the adder 6. Thus, the system controlled such that signals, for which the same quality of transmission is demanded, are all received with the same power, can remove only interference signals of large power relative to desired signals.

Embodiment 3

Figure 5:
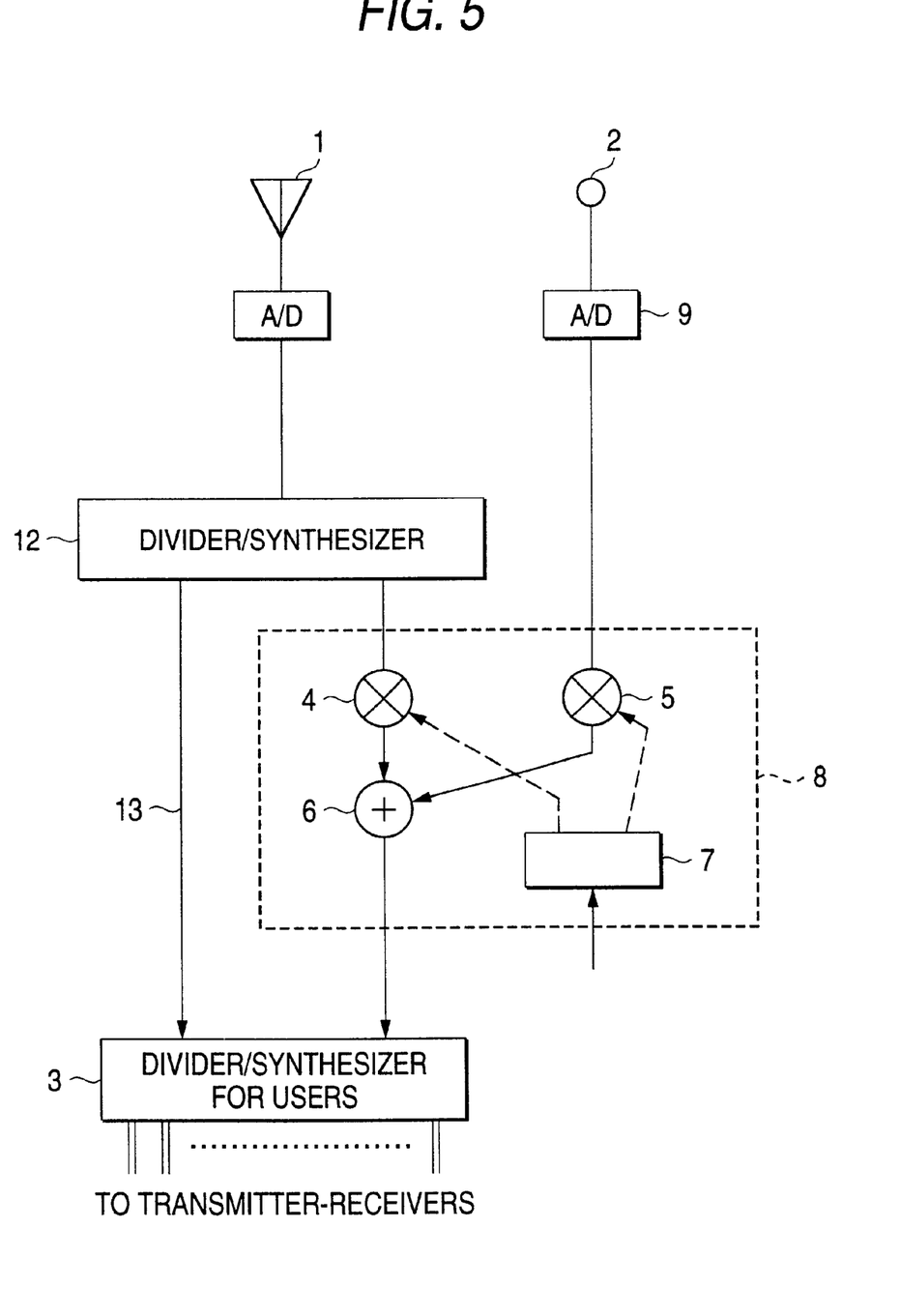
FIG. 5 is a block diagram showing the constitution of an adaptive array antenna apparatus according to an embodiment 3 of the invention.

With the adaptive array antenna apparatuses described with reference to the embodiments 1 and 2, signals of large power are targets for removal as interference. However, since high-speed transmission signals for transmission of animations or the like use many wide bands, transmission power increases. Accordingly, when signals of large power are evenly removed as interference, there is the possibility that even desired signals containing therein animations may be removed. FIG. 5 is a block diagram showing the constitution of an adaptive array antenna apparatus according to an embodiment 3 of the invention. In FIG. 5, the reference numeral 12 denotes a divider/synthesizer and 13 a path for signals of large power. In FIG. 5, the same reference numerals as those in FIG. 1 denote the same or corresponding parts to those therein, and so an explanation thereof will be omitted. With the adaptive array antenna apparatus according to the embodiment 3, output of the main antenna 1 is divided into two parts by the divider/synthesizer 12, one of the parts being input into the adaptive control device 8, and the other of the parts being input into the divider/synthesizer for users 3 via a large power signal path 13 for users of large power as shown in FIG. 5.

An explanation will be then given to actions of the adaptive array antenna apparatus shown in FIG. 5. Signals received by the main antenna 1 are converted into baseband signals by the A/D converter 9 and then input into the divider/synthesizer 12. Meanwhile, signals received by the auxiliary antenna 2 are converted into baseband signals by the A/D converter 9 and then input into the adaptive control device 8. The divider/synthesizer 12 distributes signals received by the main antenna 1, thus outputting one of the signals to the adaptive control device 8 and the other of the signals to the transmitter-receivers 10 via the divider/synthesizer for users 3.

It is possible to accommodate users of large power by inputting the other of circuits of the divider/synthesizer 12 into the post transmitter-receivers as it is. Employment of such arrangement eliminates hindrance in communication to users of large power. Also, if signals extracted after adaptive control are low in level, a circuit of higher output level can be also selected as by making comparison between the both with respect to output level by means of the circuit for users of large power.

Figure 6:
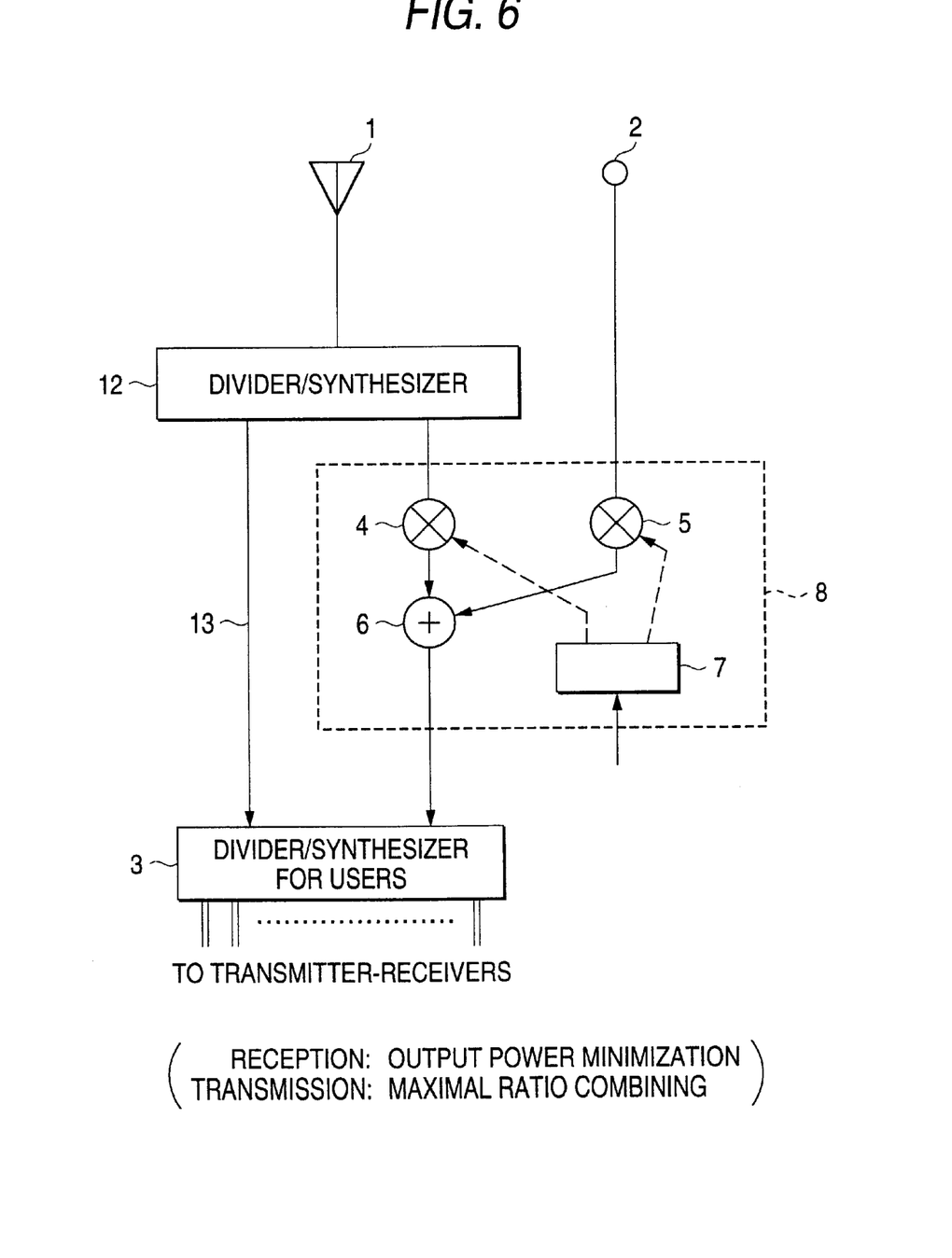
FIG. 6 is a block diagram showing the constitution of an adaptive array antenna apparatus according to the embodiment 3 of the invention.

Also, FIG. 6 is a block diagram showing the adaptive array antenna apparatus shown in FIG. 5. In FIG. 6, the same reference numerals as those in FIG. 5 denote the same or corresponding parts to those in FIG. 5, and so an explanation thereof will be omitted. With the adaptive array antenna apparatus shown in FIG. 6, signals of large power containing therein animations or the like are divided into two parts in the divider/synthesizer 12, one of the parts being input into the adaptive control device 8, and the other of the parts being input into the divider/synthesizer for users 3 via a path 13 for users of large power. Accordingly, even when large power signals are removed from signals input into the adaptive control device 8, desired signals can be taken out from signals output to the path for users of large power, so that it is possible to protect users of large power. As described above, the above adaptive array antenna apparatus is the same as the adaptive array antenna apparatus shown in FIG. 5 in protecting users of large power and suppressing interference caused by signals of large power to enable favorably preserving the quality of communication for common users transmitting voice information. Meanwhile, when signals of large power are to be transmitted, the divider/synthesizer for users 3, into which transmit signals of large power are input from the transmitter-receivers 10, outputs the transmit signals of large power to the adaptive control device 8. Also, when signals of small power are to be transmitted, transmission is made not through the adaptive control device 8.

The adaptive control device 8 makes use of the auxiliary antenna to perform adaptive control through beam scanning in a direction toward users of large power in order to reduce power consumption and interference with other users, due to unnecessary radiation. Concretely, when communication is to be made with users of large power, a weight coefficient, by which input signals to respective elements are synthesized with a maximum ratio at the time of reception, is beforehand found to be used as weighting at the time of transmission. When signals of large power are present, the weight coefficient becomes substantially equal to that, which synthesizes signals of large power with the maximum ratio. Therefore, beams can be transmitted toward users of large power to realize reduction in power consumption by a transmitting station. Also, since unnecessary radiation to other users can be reduced by scanning of beams, the quality of communication for other users becomes possible.

Figure 7:
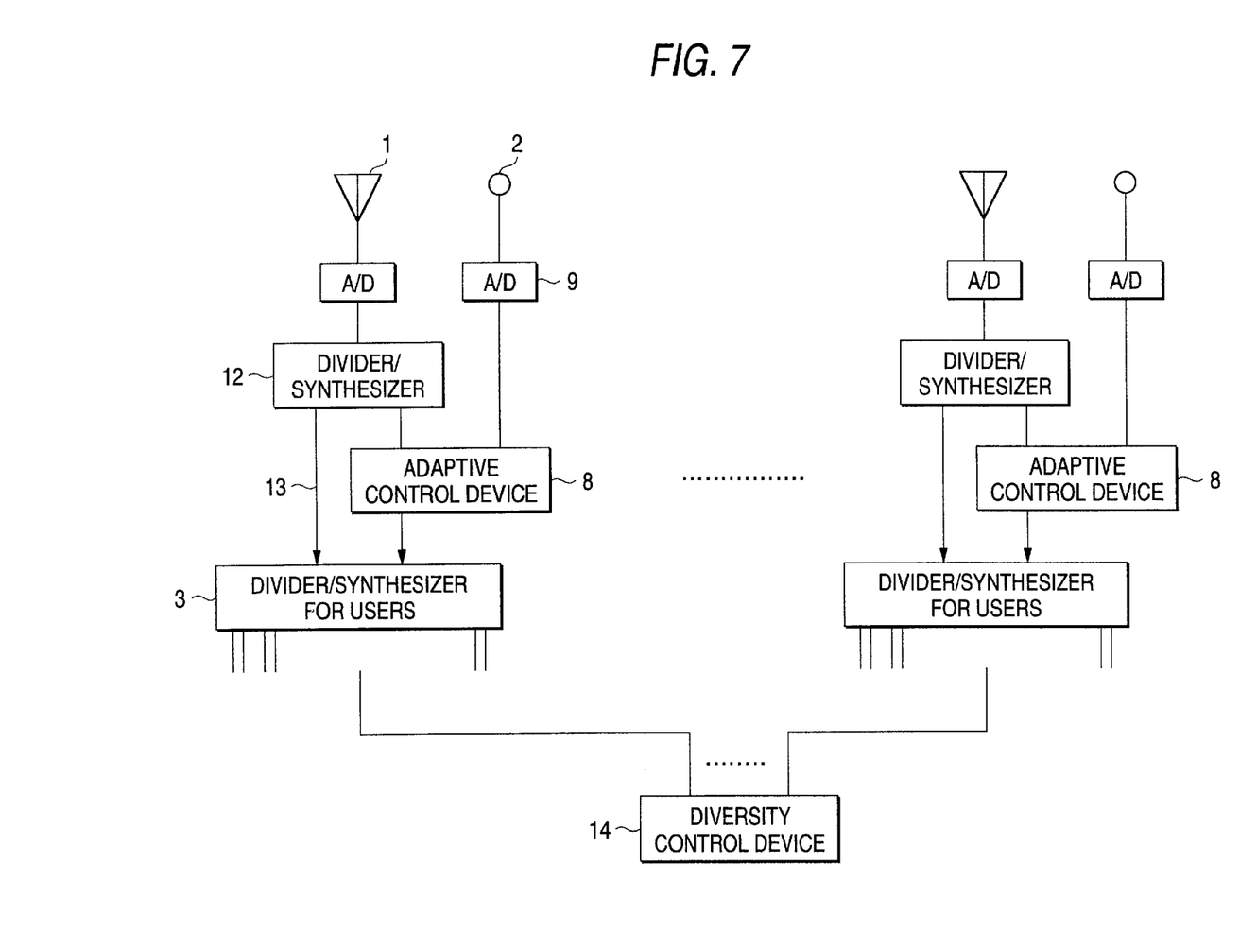
FIG. 7 is a block diagram showing the constitution of an adaptive array antenna apparatus according to the embodiment 3 of the invention.

Also, FIG. 7 is a block diagram showing a state, in which a plurality of the adaptive array antenna apparatuses described above are provided on a diversity control device 14. As shown in FIG. 7, outputs from the respective antenna apparatuses are demodulated and diversity-synthesized by the diversity control device 14, whereby it is possible to improve SNR after reception and hence the quality of communication.

Embodiment 4

Figure 8:
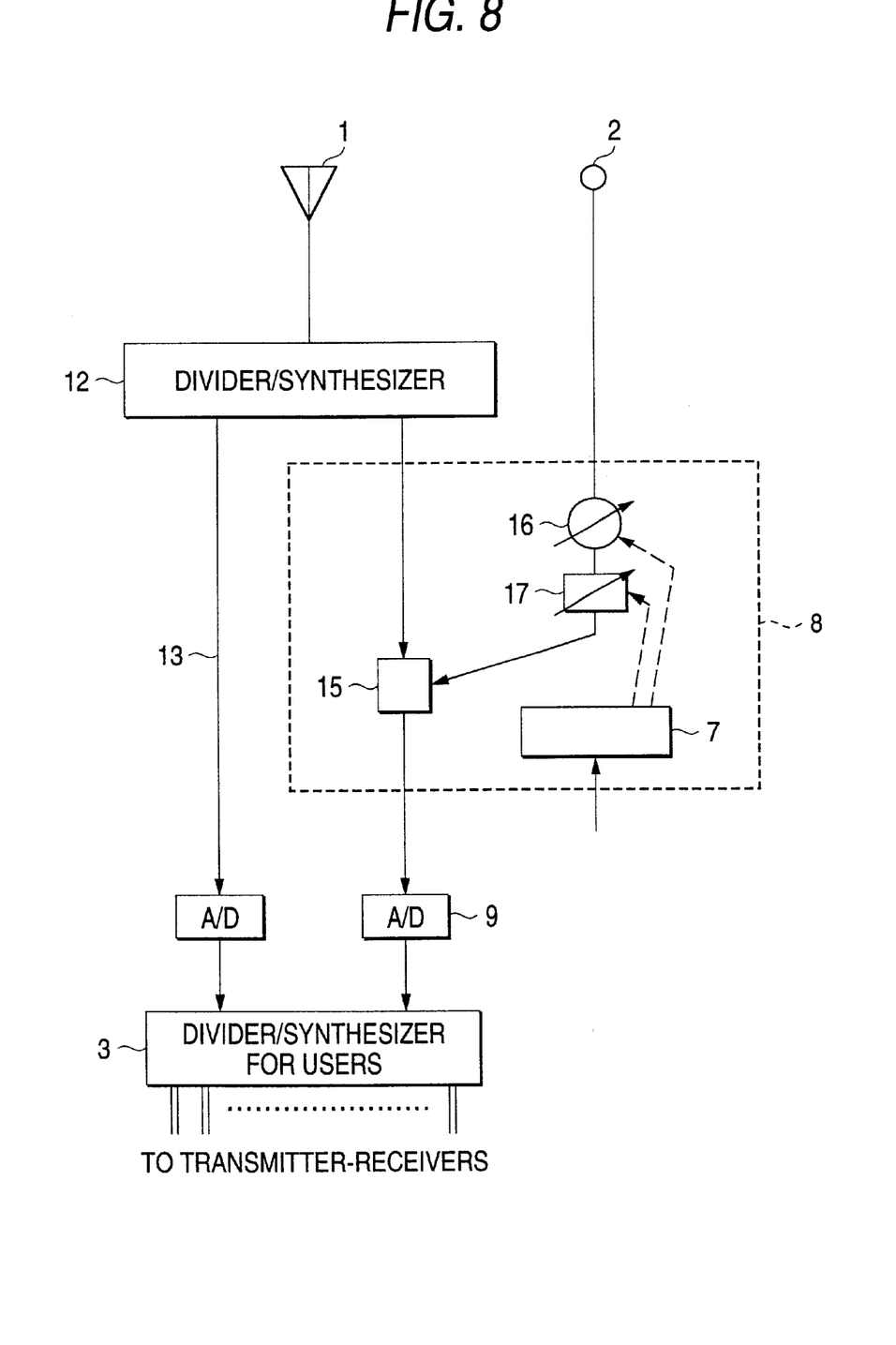
FIG. 8 is a block diagram showing the constitution of an adaptive array antenna apparatus according to an embodiment 4 of the invention.

With the adaptive array antenna apparatuses described with respect to the embodiments 1 to 3, signal processing is carried out by using the A/D converter 9 to convert antenna outputs into baseband signals. This may be realized by an analog circuit as they are in the form of RF signals or IF signals and A/D conversion in the A/D converter 9 provided after the adaptive control device 8 with the use of an arrangement, in which output of the auxiliary antenna is adjusted by a phase shifter 16 and an attenuator 17 and synthesized with output of the main antenna 1 in a synthesizer 15, as shown in FIG. 8.

The adaptive array antenna apparatus constructed in the above-mentioned manner can constitute a signal processing system disposed immediately below the antennas and having the interference removing function and has no need of any constitution of systems for processing such as down-conversion into baseband signals, digitization by an A/D converter or the like in a previous portion of the apparatus, so that it is possible to effect minimization of and improved installation property of the apparatus.

Embodiment 5

Figure 9:
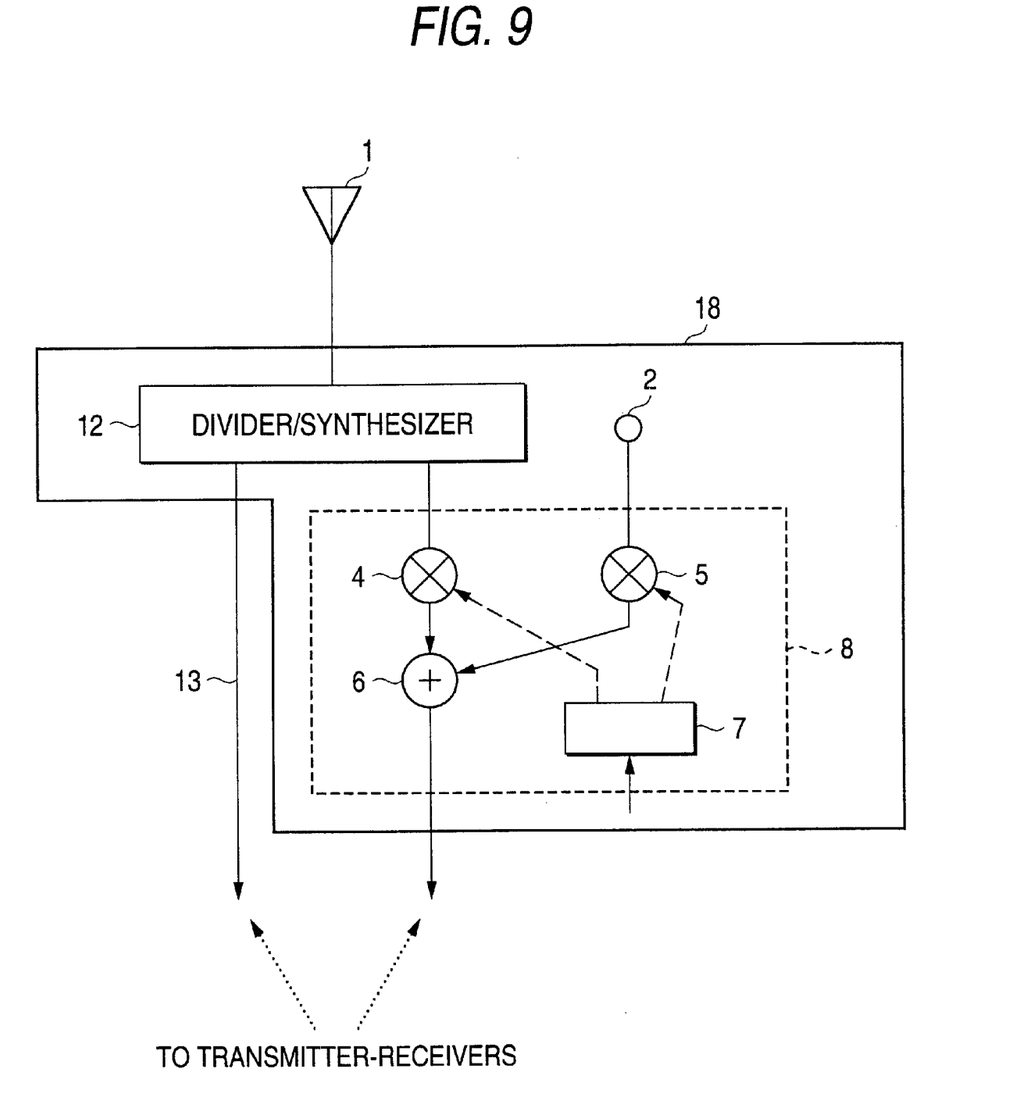
FIG. 9 is a block diagram showing the constitution of an antenna apparatus for base stations, according to an embodiment 5 of the invention.

FIG. 9 is a block diagram showing the constitution of an antenna apparatus for base stations, according to an embodiment 5 of the invention. The reference numeral 18 denotes an antenna apparatus for base stations. In FIG. 9, the same reference numerals as those in FIG. 5 denote the same or corresponding parts to those therein, and so an explanation thereof will be omitted. The antenna apparatus 18 for base stations includes an auxiliary antenna 2, an adaptive control device 8, and a divider/synthesizer 12, and an interference removing function can be added to the functions of a base station by connecting the antenna apparatus 18 for base stations to the main antenna 1 provided in the base station to add the same to an existing equipment.

The above antenna apparatus 18 for base stations enables addition of the interference removing function without applying any considerable reconstruction and modification of specification to an existing antenna apparatus in an associated base station. Also, since adaptive control is made prior to distribution of received signals to respective transmitter-receivers, the apparatus according to the invention can be inserted, for example, immediately below a sector antenna provided in existing base stations.

Accordingly, addition of the interference removing function is enabled with little influence on radio control devices such as post transmitter-receivers. Also, since an auxiliary antenna of small size accomplishes an adequate interference removing function, it can be prevented from changing so much from an original size. Work for installing the above-mentioned antenna apparatus 18 for base stations on a base station can be carried out at low cost and with small labor since the necessity of reconstructing an existing equipment is small in consideration of adaptive control.

What is claimed is:

1. An adaptive array antenna apparatus comprising a main antenna, an auxiliary antenna smaller than the main antenna, an adaptive control device having weighting means for applying weighting to signals output from the main antenna and the auxiliary antenna with the use of a predetermined weight coefficient, and synthesizing means for synthesizing signals, which are output from the main antenna and the auxiliary antenna and to which weighting is applied by the weighting means, and a weighting control device for calculating a weight coefficient so that electric power of signals output from the synthesizing means becomes minimum, and for outputting the calculated weight coefficient to the weighting means to control weighting, the adaptive control device acting to output signals output from the synthesizing means, to transmitter-receivers.

2. The adaptive array antenna apparatus as set forth in claim 1, wherein the adaptive control device outputs signals, which are obtained by removing interference signals from wide band signals spreading-modulated on a transmission side employing a CDMA system, to the transmitter-receivers having matched filters for despreading from wide band signals to narrow band signals.

3. The adaptive array antenna apparatus as set forth in claim 1, further comprising a distributor for outputting a part of signals received by the main antenna to the adaptive control device and the remaining signals to the transmitter-receivers without passage through the adaptive control device.

4. The adaptive array antenna apparatus as set forth in claim 3, wherein the weighting control device calculates a weight coefficient through addition of predetermined pseudo-noise components to thermal noise components among components contained in received signals to thereby vary the weight coefficient.

5. The adaptive array antenna apparatus as set forth in claim 3, wherein the weighting control device calculates a weight coefficient, by which signals of large power received by the main antenna and the auxiliary antenna are synthesized at a maximum ratio, to output the same to the adaptive control device and controls weighting of signals input into the adaptive control device from the transmitter-receivers when signals of large power are to be transmitted.

6. An adaptive array antenna apparatus comprising a distribution synthesizer connected to a main antenna provided in a base station for distributing and outputting signals received by the main antenna, an auxiliary antenna, of which size is determined depending upon levels of interference signals of an environment where the base station is installed, and an adaptive control device having weighting means for using a predetermined weight coefficient to apply weighting to signals output from the main antenna and the auxiliary antenna, synthesizing means for synthesizing signals, which are output from the main antenna and the auxiliary antenna and to which weighting is applied by the weighting means, and a weighting control device for calculating a weight coefficient so that electric power of signals output from the synthesizing means becomes minimum and for outputting the calculated weight coefficient to the weighting means to control weighting, the adaptive control device acting to output signals output from the synthesizing means, to transmitter-receivers.

* * * * *